United States Patent
Missett et al.

(10) Patent No.: US 8,824,308 B2
(45) Date of Patent: Sep. 2, 2014

(54) ETHERNET OAM TO ATM OAM INTERWORKING FOR LOOPBACK CAPABILITY

(75) Inventors: Shaun N. Missett, Avon, CT (US);
Steven J. Brooks, Healdsburg, CA (US);
Jeffrey A. Buffum, Bolton, MA (US)

(73) Assignee: Calix, Inc., Petaluma, CA (US)

( * ) Notice: Subject to any disclaimer, the term of this patent is extended or adjusted under 35 U.S.C. 154(b) by 132 days.

(21) Appl. No.: 13/452,041

(22) Filed: Apr. 20, 2012

(65) Prior Publication Data
US 2012/0294154 A1 Nov. 22, 2012

Related U.S. Application Data (60) Provisional application No. 61/488,032, filed on May 19, 2011.

(51) Int. Cl.
*H04J 3/16* (2006.01)
*H04L 12/66* (2006.01)
*H04L 29/06* (2006.01)
*H04L 12/56* (2006.01)
*H04L 12/70* (2013.01)

(52) U.S. Cl.
CPC ............... *H04L 12/66* (2013.01); *H04L 69/08* (2013.01); *H04L 49/3009* (2013.01); *H04L 2012/5625* (2013.01)
USPC .......................................... 370/241; 370/467

(58) Field of Classification Search
None
See application file for complete search history.

(56) References Cited

U.S. PATENT DOCUMENTS

| 7,558,274 | B1 | 7/2009 | Kinsky et al. | |
|---|---|---|---|---|
| 2007/0237156 | A1* | 10/2007 | Wang | 370/395.5 |
| 2009/0067437 | A1* | 3/2009 | Krishnan | 370/395.53 |

OTHER PUBLICATIONS

Technical Report, DSL Forum, TR-101, Migration to Ethernet-Based DSL Aggregation, Architecture and Transport Working Group, Apr. 2006, 101 pages.
ITU-T Recommendation I.610, Series I: Integrated Services Digital Network, Maintenance principles, B-ISDN operation and maintenance principles and functions, International Telecommunication Union, Feb. 1999, 88 pages.
ITU-T Recommendation Y.1731. Series Y: Global Information Infrastructure, Internet Protocol Aspects and Next-Generation Networks, Internet protocol aspects—Operation, administration and maintenance, OAM functions and mechanisms for Ethernet based networks, International Telecommunications Union, Feb. 2008, 82 pages.
IEEE Std. 802.1ag, Virtual Bridged Local Area Networks, Amendment 5: Connectivity Fault Management, Sep. 27, 2007, 260 pages.

* cited by examiner

*Primary Examiner* — Kevin C Harper
(74) *Attorney, Agent, or Firm* — Shumaker & Sieffert, P.A.

(57) ABSTRACT

In general, techniques are described for interworking between Ethernet organization, administration, and maintenance (OAM) frames and Asynchronous Transfer Mode (ATM) ATM OAM cells. For example, an access node in an Ethernet and ATM network may implement the techniques. The access node comprises an Ethernet interface that receives an Ethernet OAM Loopback frame from a device within an Ethernet network. The access node includes a control unit that constructs an ATM OAM End-to-End Loopback cell from the Ethernet OAM Loopback frame, and an ATM interface that transmits the ATM OAM End-to-End Loopback cell from the access node towards a virtual circuit connected to a subscriber device to verify connectivity from the originating device within the Ethernet network to the subscriber device within the ATM network.

40 Claims, 6 Drawing Sheets

ETHERNET OAM TO ATM OAM INTERWORKING FOR LOOPBACK CAPABILITY

This application claims the benefit of U.S. Provisional Application No. 61/488,032, filed May 19, 2011, which is hereby incorporated by reference in its entirety.

TECHNICAL FIELD

This disclosure relates to computer networking and, more particularly, to network maintenance in a computer network.

BACKGROUND

A service provider network typically comprises a number of different types of computer networks interconnected to one another. One type of network, referred to as an access network, enables host devices, which may also be referred to as subscriber devices or customer premises equipment (CPE), to access the service provider network via subscriber lines. Subscriber devices or CPEs may comprise set-top boxes (STBs), laptop computers, desktop computers, mobile devices (such as mobile cellular phones and so-called "smart phones"), Voice over Internet Protocol (VoIP) telephones, workstations, modems, wireless access points (WAPs), gaming consoles, and other devices capable of accessing or otherwise facilitating access to the service provider network.

The access network typically comprises a number of access nodes, such as a Digital Line Subscriber Line Access Multiplexer (DSLAM) or a Cable Modem Termination System (CMTS), that each manages access by one or more of the subscriber devices to the service provider network. The access node may, for example, multiplex (or "aggregate") traffic from subscriber devices into a composite signal and transmit this signal upstream to the subscriber network for delivery to one or more destinations.

SUMMARY

In general, this disclosure is directed to techniques that allow interworking between Ethernet and Asynchronous Transfer Mode (ATM) portions of an access network in order to verify end-to-end connectivity from an originating device within the Ethernet network to a subscriber device within the ATM network. Service provider access networks are migrating from ATM infrastructures toward Ethernet infrastructures. The edge and access portions of the service provider network, however, may still include existing ATM-based access devices and customer premises equipment (CPE). Conventionally, within the mixed Ethernet and ATM access network, Ethernet operation, administration, and maintenance (OAM) capabilities and ATM OAM capabilities are only applicable within the respective portions of the access network.

The techniques of this disclosure allow an Ethernet OAM Loopback frame to initiate an ATM OAM End-to-End Loopback cell towards a specific virtual circuit (VC) connected to the subscriber device within the ATM network. Similarly, the techniques allow an ATM OAM Loopback reply cell to initiate an Ethernet OAM Loopback reply frame towards the originating device within the Ethernet network. In this way, the techniques allow network operators to use interworking between Ethernet and ATM Loopback messages for end-to-end troubleshooting in a mixed Ethernet and ATM network.

In one example, the disclosure is directed to a method comprising receiving, with an access node, an Ethernet operations, administration, and maintenance (OAM) Loopback frame from an originating device within an Ethernet network, constructing, with the access node, an Asynchronous Transfer Mode (ATM) OAM End-to-End Loopback cell from the Ethernet OAM Loopback frame, and transmitting the ATM OAM End-to-End loopback cell from the access node towards a virtual circuit connected to a subscriber device within an ATM network to verify end-to-end connectivity from the originating device within the Ethernet network to the subscriber device within the ATM network.

In another example, the disclosure is direct to an access node comprising an Ethernet interface that receives an Ethernet operations, administration, and maintenance (OAM) Loopback frame from an originating device within an Ethernet network, a control unit that constructs an Asynchronous Transfer Mode (ATM) OAM End-to-End Loopback cell from the Ethernet OAM Loopback frame, and an ATM interface that transmits the ATM OAM End-to-End Loopback cell from the access node towards a virtual circuit connected to a subscriber device within an ATM network to verify connectivity from the originating device within the Ethernet network to the subscriber device within the ATM network.

In another example, the disclosure is directed to a computer-readable medium comprising instructions that, when executed, cause one or more processors to receive, with an access node, an Ethernet operations, administration, and maintenance (OAM) Loopback frame from an originating device within an Ethernet network construct, with the access node, an Asynchronous Transfer Mode (ATM) OAM End-to-End Loopback cell from the Ethernet OAM Loopback frame, and transmit the ATM OAM End-to-End Loopback cell from the access node towards a virtual circuit connected to a subscriber device within an ATM network to verify end-to-end connectivity from the originating device within the Ethernet network to the subscriber device within the ATM network.

The details of one or more aspects of the disclosure are set forth in the accompanying drawings and the description below. Other features, objects, and advantages of the disclosure will be apparent from the description and drawings, and from the claims.

DETAILED DESCRIPTION

Internet Service Providers (ISPs) may use technologies, such as Digital Subscriber Line (DSL), to provide subscriber devices or customer premises equipment (CPEs) with data connectivity over the wires of a telephone network. Subscriber devices or CPE may comprise set-top boxes (STBs), laptop computers, desktop computers, mobile devices (such as mobile cellular phones and so-called "smart phones"), Voice over Internet Protocol (VoIP) telephones, workstations, modems, wireless access points (WAPs), gaming consoles, and other devices capable of accessing or otherwise facilitating access to the service provider network. Traditionally, DSL lines operate according to a standardized switching technique known as Asynchronous Transfer Mode (ATM). ATM bundles data in data units of fixed size called cells. Additionally, ATM utilizes a connection-oriented model, which creates a virtual circuit between two endpoints involved in an ATM data exchange.

ISPs are currently migrating from ATM-based networks to Ethernet-based networks. Ethernet provides connectionless data transfer, and variable sized frames, among other features. In particular, some ISPs are migrating from an ATM-based core network to an Ethernet-based core network. The core network is the central part of a network that provides various services to customers connected to the core network by an access network. The access network may include connections from the core network to customers, using a variety of technologies, including DSL. The migration from ATM to Ethernet occurs from the core network outwards such that an ISP may have a core Ethernet network with ATM-based access nodes and CPEs. As the migration to Ethernet continues, eventually the ATM-based devices may be replaced to create an end-to-end Ethernet network.

Having an Ethernet-based core network and an ATM-based edge network poses challenges in terms of ensuring communication compatibility between the two types of networks. To interwork Ethernet data frames to ATM-based data cells, an access node receiving Ethernet traffic may employ an encapsulation scheme to convert the Ethernet traffic into ATM Adoption Layer 5 (AAL5) data streams. Using AAL5, one or more network devices may interwork between data frames of one or more Ethernet-based networks and data cells of one or more ATM-based networks. In the example of an ISP migrating to an Ethernet-based core, an access device that implements AAL5 may interwork between the data frames of the Ethernet-based core and data cells of the ATM-based network edge.

In addition, challenges are encountered in terms of providing end-to-end connectivity fault management (CFM) capabilities between an originating device in one network and a subscriber device in another network. CFM capabilities may include fault detection, fault verification, fault isolation, and other operations, administration, and management (OAM) capabilities in a mixed Ethernet and ATM network.

As an example, when an ISP provides connectivity to CPEs, one or more network links, such as a link between an access node and one or more CPEs may experience a fault. The fault may be a bad line, switch, or CPE device. The ISP may perform CFM techniques to detect the fault and determine the cause or location of the fault. As an example, the CFM techniques may inform the ISP of whether or not one or more CPEs can communicate with the core network of the ISP. The CFM techniques may include loopback messages used to verify end-to-end connectivity between two network devices. More information about CFM techniques may be found in the IEEE (Institute for Electrical and Electronics Engineers) 802.1ag standard, entitled "IEEE Standard for Local and Metropolitan Area Networks Virtual Bridged Local Area Networks Amendment 5: Connectivity Fault Management," published Dec. 17, 2007, which is herein incorporated by reference.

Standardized OAM protocols include a set of protocols and standards for troubleshooting networks. As a subset of these techniques, the CFM techniques include using loopback messages (LBMs). In traditional ATM-based broadband networks, ATM OAM Loopback (LB) capabilities are used to diagnose network connectivity failures. An OAM loopback operation is performed by transmitting an ATM OAM loopback cell from an originating device, e.g., a router or a broadband network gateway, of the service provider network toward a subscriber CPE. The CPE immediately resends the cell back toward the originating device. The successful receipt of an OAM Loopback reply by the originating device indicates that end-to-end connectivity exists between the originating device and the subscriber. Further details of ATM-based OAM are described in the International Telecommunications Union Standardization Sector (ITU-T) I.610 standard, entitled "ITU-T Recommendation I.610: B-ISDN operation and maintenance principles and functions," published February of 1999, which is herein incorporated by reference.

As stated above, service provider access networks are currently migrating from ATM infrastructure toward an all Ethernet access network. The IEEE (802.1ag) and ITU (Y.1731) have defined Ethernet OAM standards that include Ethernet based OAM capabilities analogous to the LB capabilities provided by ATM OAM. These standards define messages that are variable in size, up to the maximum size of an Ethernet frame (i.e., 1,500 bytes). The Y.1731 standard, entitled "ITU-T Recommendation Y.1731: OAM functions and mechanisms for Ethernet based networks," approved July 2011, is herein incorporated by reference.

The techniques described in this disclosure define an interworking function between Ethernet OAM Loopback frames and ATM OAM End-to-End Loopback cells. The described techniques enable service providers to interwork between Ethernet and ATM OAM loopback capabilities to perform end-to-end loopback operations in a mixed Ethernet and ATM network. The interworking function operates by translating relevant fields from an Ethernet OAM Loopback frame into an ATM OAM End-to-End Loopback cell for transmission toward an ATM-based network element and vice versa.

Figure 1:
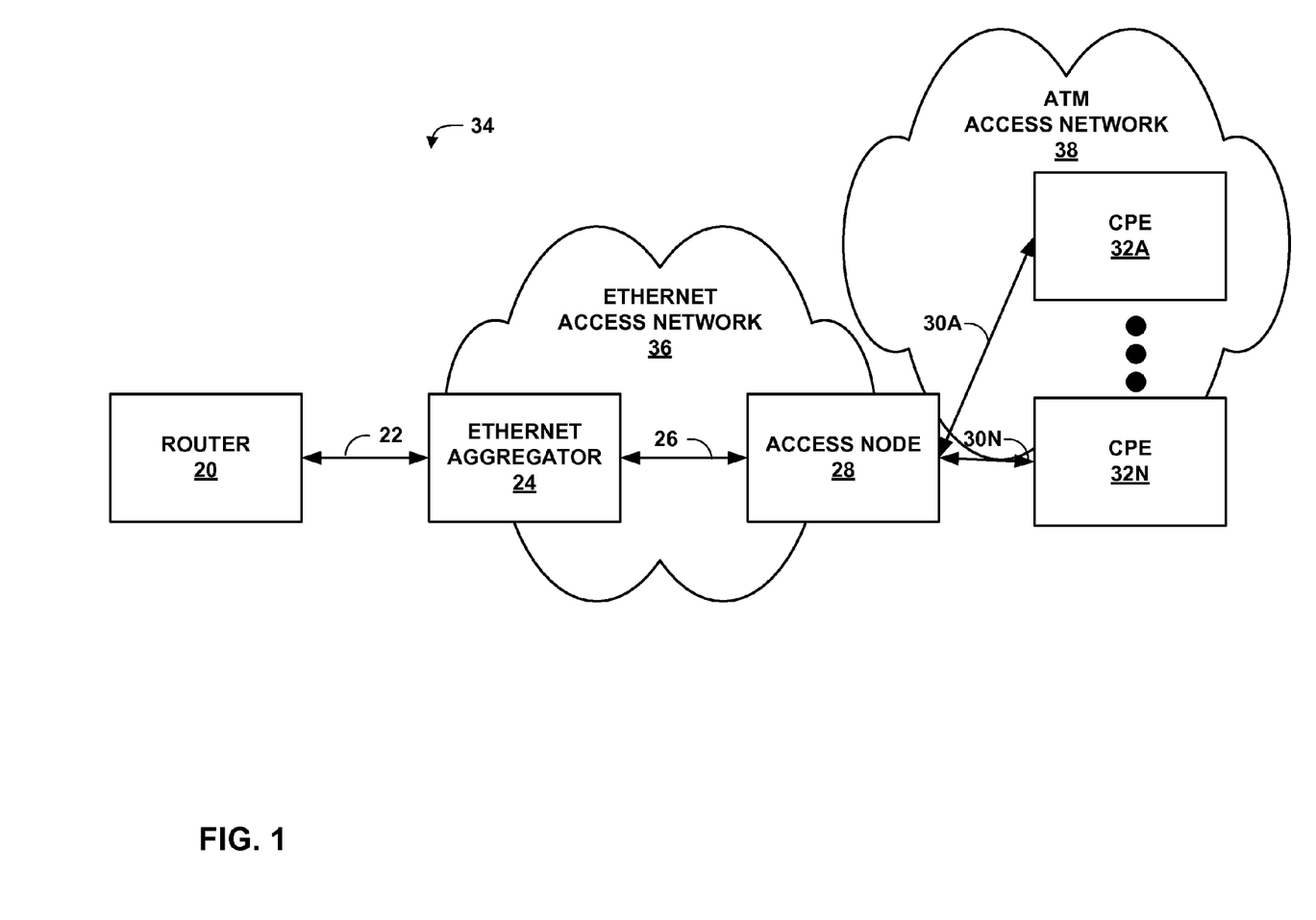
FIG. 1 is a block diagram illustrating a service provider network that includes an Ethernet-based network with an access portion that includes an Ethernet access network and an ATM access network.

FIG. 1 is a block diagram illustrating a service provider network 34 including an Ethernet-based network with an access portion that includes an Ethernet access network 36 and an ATM access network 38. FIG. 1 further illustrates an access node 28 configured to perform interworking between Ethernet-based networking devices and ATM-based networking devices. According to the techniques of this disclosure, access node 28 may convert Ethernet OAM Loopback frames to ATM-based OAM End-to-End Loopback cells, and vice versa, in order to verify end-to-end connectivity from an originating device in Ethernet-based service provider network 34 to a subscriber device in ATM access network 38.

Service provider network 34 may include one or more Ethernet aggregators, access nodes, and/or client devices. In the example of FIG. 1, router 20 may be connected via communication link 22 to an Ethernet aggregator 24. Ethernet aggregator 24 may be connected via communication link 26 to access node 28. Access node 28 may also be connected via communication links 30A through 30N (collectively referred to as "communication links 30") to one or more of CPEs (Consumer Premises Equipment) 32A-32N (collectively referred to as "CPEs 32"). In other examples, router 20 may be connected to more than one Ethernet aggregator within Ethernet access network 36 or within other access networks (not shown) of service provider network 34. In addition, Ethernet access network 36 may include more than one access node connected to Ethernet aggregator 24.

In the illustrated example of FIG. 1, the communication links between router 20, Ethernet aggregator 24, and access node 28, that is, communication links 22 and 26, may be Ethernet-based communication links. Ethernet-based communication links may include fiber optic cables, coaxial cables, unshielded twisted pair (UTP) copper cables (also referred to as "category 5" or "category 6" cables), phone lines, or any other connection between one or more devices that is capable of transmitting an Ethernet frame.

Communication links between access node 28 and CPEs 32, that is communication links 30, may be ATM-based communication links. ATM-based communication links may generally include any medium capable of supporting transmission of ATM-based traffic. ATM-based communication links may comprise, for example, fiber optic cables, UTP cables, phone lines, coaxial cables, or any other medium capable of supporting ATM-based traffic between one or more devices. Communication links 30 may each comprise a different type of communication link. In an example, communication link 30A may comprise a fiber optic connection to CPE 32A, and communication link 30N may comprise a copper connection to CPE 32N.

There may also be one or more additional nodes or switches between access node 28 and CPEs 32. In an example, communication link 30A may connect to an access device (not shown) that receives an ATM cell via an optical link and retransmits the ATM cell via a copper communication link to CPE 32A and/or other CPEs. For example, the access device (not shown) may provide access to service provider network 34 for one or more CPEs included in one or more customer premises in a neighborhood or an office building. As another example, the access device (not shown) may provide access to service provider network 34 for one or more CPEs included in a customer network, e.g., a local area network (LAN) in one or more customer premises.

In some examples, ATM access network 38 may comprise at least part of a passive optical network (PON) or at least part of an active optical network. In this case, access node 28 may comprise an optical line terminal (OLT) and transmit a signal via an optical link to one or more access nodes (not shown) that comprise optical network terminals (ONTs). Each ONT may receive the signal over the optical link, and may retransmit the signal to one or more CPEs via one or more copper communication links. An ONT may also perform a generally reciprocal process, in which the ONT receives data over a copper cable communication link, and retransmits the over a fiber optic interface via a fiber optic communication link.

To perform a loopback test on a particular CPE, an originating device, i.e., router 20, may transmit an Ethernet OAM Loopback frame that identifies a particular CPE, e.g., CPE 32A, connected to a particular access node 28 to test for connectivity. The specific access node 28 and CPE 32A may be specified using one or more VLAN tags, described in more detail below. Ethernet aggregator 24 may receive the OAM loopback frame and may also aggregate one or more network connections in parallel to increase throughput and to provide redundancy in case of network link failures. Ethernet aggregator 24 may transmit the received Ethernet OAM loopback frame to access node 28. According to the techniques described in this disclosure, the access node 28 may receive the Ethernet OAM loopback frame on an Ethernet interface, and convert the Ethernet OAM Loopback frame to an ATM OAM End-to-End Loopback cell. Access node 28 may further construct the ATM OAM End-to-End Loopback cell with a virtual circuit identifier (VCI) and a virtual path identifier (VPI) of a virtual circuit associated with CPE 32A, and send the cell to CPE 32A via the virtual circuit.

Assuming that one or more communication links connecting access node 28 and CPE 32A are not faulty, CPE 32A may receive the OAM loopback cell via the one or more communication links. A device compatible with ATM OAM may respond to the sender of the OAM loopback cell with a nearly identical OAM loopback reply (LBR) cell that has a value indicating that the OAM-compatible device, in this case CPE 32A, has received the loopback cell. Again, assuming that the one or more communication links between CPE 32A and access node 28 are not faulty, access node 28 may receive the ATM OAM LBR cell. Access node 28 may examine the received LBR cell and convert it to an Ethernet LBR frame according to the techniques of this disclosure. Access node 28 may further transmit the Ethernet LBR frame to Ethernet aggregator 24, which may further transmit the Ethernet LBR frame to the originating router 20.

Router 20 may determine whether or not there is a connectivity issue or a fault with a communication link between router 20 and CPE 32A based on whether or not router 20 receives the loopback response to the original OAM loopback message. If router 20 receives the LBR, router 20 may determine that there is end-to-end connectivity with CPE 32A. If router 20 fails to receive the LBR, or the LBR is received after too long of a delay after sending the original loopback message, router 20 may determine that there is a connectivity issue with CPE 32A.

Figure 2:
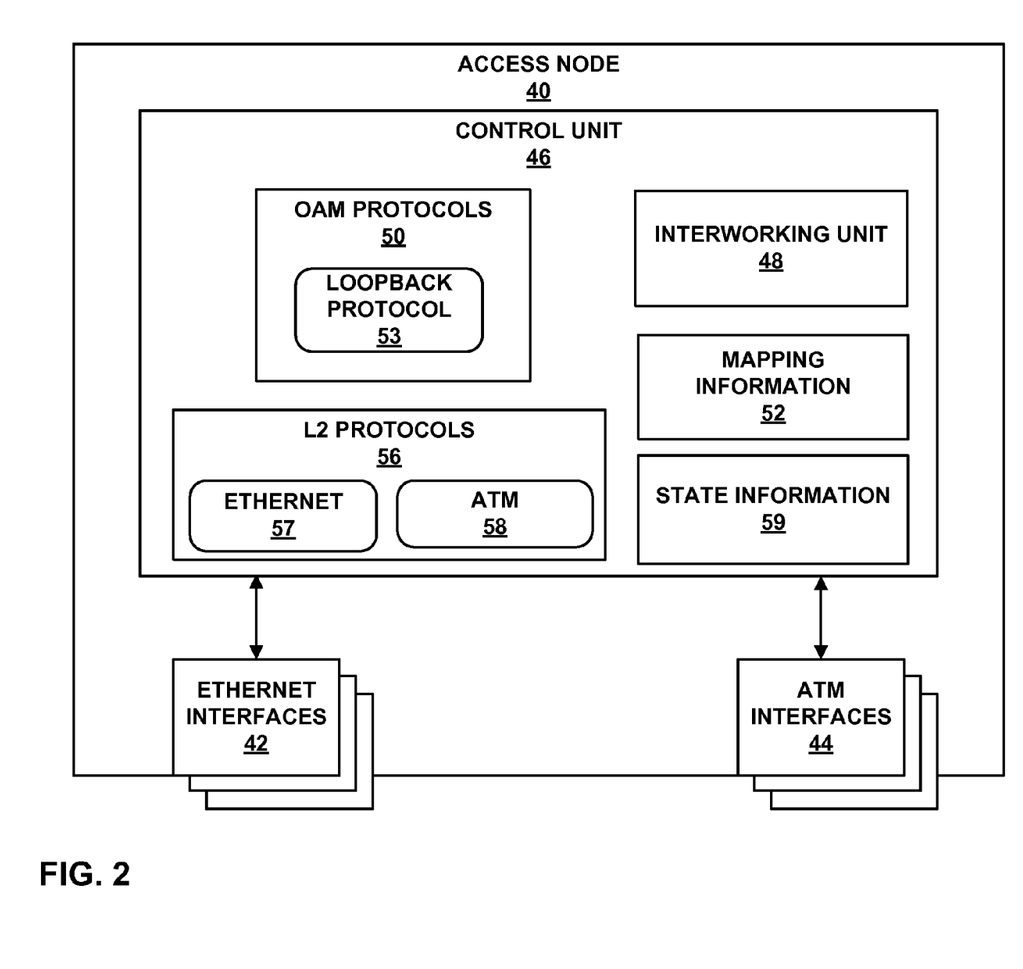
FIG. 2 is a block diagram illustrating an access node configured to interwork loopback messages between one or more Ethernet interfaces and one or more ATM interfaces in accordance with the techniques of this disclosure.

FIG. 2 is a block diagram illustrating an access node 40 configured to interwork loopback frames between one or more Ethernet interfaces and one or more ATM interfaces in accordance with the techniques of this disclosure. Access node 40 may operate substantially similar to access node 28 from FIG. 1. In an example, access node 40 may comprise a C7 Multi-Service Access Node from Calix Networks, Inc. Access node 40 may convert between an Ethernet OAM Loopback frame and an ATM OAM End-to-End Loopback cell. In the example of FIG. 2, access node 40 includes Ethernet interfaces 42, and ATM interfaces 44. Ethernet interfaces 42 and ATM interfaces 44 may be connected electrically, communicatively, or otherwise, to a control unit 46. Control unit 46 may include OAM protocols 50, interworking unit 48, mapping information 52, L2 protocols 56, and state information 59.

Access node 40 may include one or more processors that execute software instructions, such as those used to define a software or computer program, stored to a computer-readable storage medium, such as a storage device (for example, a disk drive, or an optical drive), or memory (such as Flash memory, or random access memory (RAM)) or any other type of volatile or non-volatile memory, that stores instructions to cause a programmable processor to perform the techniques described herein. Alternatively, access node 40 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each of Ethernet interfaces 42 and ATM interfaces 44 represents an interface for interfacing with a physical communication medium, such as a different one of communication links 26 and 30 from FIG. 1. An interface card (IFC) may comprise one or more of Ethernet interfaces 42 and ATM interfaces 44, which in this context may be referred to as ports. Each IFC may be inserted into a slot of a chassis that couples to control unit 46 via a backplane or other high-speed interconnection. Ethernet interfaces 42 may send and receive Ethernet frames via a communication link, such as communication link 26 of FIG. 1. ATM interfaces 44 may similarly send and receive ATM cells via a communication link, such as communication link 30A of FIG. 1.

Upon receiving an Ethernet frame or an ATM cell, at least one of Ethernet interfaces 42 or ATM interfaces 44 may send at least part of the frame to interworking unit 48 of control unit 46. Control unit 46 may generally interwork between Ethernet frames and ATM cells. More specifically, interworking unit 48 of control unit 46 may also convert an Ethernet OAM Loopback frame to an ATM OAM End-to-End Loopback cell. To convert an ATM End-to-End Loopback cell to an Ethernet Loopback frame, interworking unit 48 may generally perform a reciprocal process.

Interworking unit 48 may examine an Ethernet frame received on Ethernet interface 42 and/or an ATM cell received on ATM interface 44 to determine whether the incoming frame or cell is an OAM Loopback message. If the frame or cell is an Ethernet OAM Loopback message, interworking unit 48 may convert between an Ethernet OAM Loopback frame and an ATM OAM End-to-End Loopback cell according to the techniques of this disclosure. More specifically, interworking unit 48 may translate one or more fields of an Ethernet OAM Loopback frame into at least one field of an ATM OAM End-to-End Loopback cell.

OAM protocols 50 may support a loopback protocol 53. In other example, OAM protocols 50 may support protocols for other OAM or CFM capabilities. As illustrated in FIG. 2, OAM protocols 50 and loopback protocol 53 represent instances of protocols used to illustrate that access node 40 supports OAM protocols 50. Control unit 46 may also include L2 protocols 56. L2 protocols 56 may support switching techniques and specific network protocols, such as Ethernet protocol 57 and ATM protocol 58. Ethernet protocol 57 and ATM protocol 58 may be thought of as instances of protocols, and are used to illustrate that access node 40 supports L2 protocols 56.

Mapping information 52 may generally comprise information that allows access node 40 to determine one or more fields of an ATM End-to-End Loopback cell from one or more fields of an Ethernet Loopback frame. In an example, access node 40 may determine a destination CPE based on two VLAN tags of a received Ethernet OAM Loopback frame. Based on the combination of VLAN tags and maintenance (MD) level and version information of the Ethernet frame, access node 40 may determine the VCI and VPI for the destination CPE, such as CPE 32A, from mapping information 52. Access node 40 may further construct an ATM OAM End-to-End Loopback cell with the VPI and VCI information, and transmit the ATM OAM End-to-End Loopback cell toward the destination CPE via the virtual circuit identified by the VPI and VCI information. This case is referred to as the "1:1" case, because each combination of two VLAN tags and MD version information of the Ethernet Loopback frame identifies a particular destination CPE.

In another example, access node 40 may receive an Ethernet OAM Loopback frame. The combination of two VLAN tags, a destination MAC address, and MD level and version information of the frame may identify a particular destination CPE to access node 40. This case is referred to as the "N:1 case" because there may be "N" subscribers for a particular combination of VLAN tags. In the N:1 case, the combination of two VLAN tags, and the destination unicast MAC address of the frame may identify a particular access node and a CPE connected to that access node. Based on the combination of VLAN tags, the destination MAC address, and the MD level and version information of the received Ethernet Loopback frame, access node 40 may look up the VCI and VPI for the destination CPE, such as CPE 32A, from mapping information 52. Access node 40 may further construct an ATM End-to-End Loopback cell with the VPI and VCI information obtained from mapping information 52, and transmit the ATM End-to-End Loopback cell to the destination CPE via the virtual circuit identified by the VPI and VCI information.

In the 1:1 case, a combination of VLAN tags, along with MD level and version information, may identify a particular access node and CPE connected to the access node, on which to perform a loopback test. In addition, in the 1:1 case, a multicast MAC address or a well-known unicast MAC address of access node 40 may be used as the destination MAC address for the Ethernet OAM Loopback frame. As an example of the 1:1 case, at least one of Ethernet interfaces 42 may receive an Ethernet OAM Loopback frame originating from router 20 of FIG. 1. Interworking unit 48 may inspect the frame and determine that the frame is an OAM Loopback frame comprising a loopback message and should, therefore, be converted to an ATM OAM End-to-End Loopback cell.

According to the techniques described herein, interworking unit 48 may create an ATM OAM End-to-End Loopback cell based on the frame received from Ethernet interfaces 42. More specifically, interworking unit 48 may translate one or more fields from the Ethernet Loopback frame of interface 42 to one or more fields of an ATM OAM End-to-End Loopback cell according to the techniques of this disclosure. Interworking unit 48 may use the VLAN tags of the Ethernet OAM Loopback frame to lookup VPI and VCI information for the cell from mapping information 52. ATM interfaces 44 may receive the ATM OAM End-to-End Loopback cell constructed by interworking unit 48, and transmit the ATM OAM End-to-End Loopback cell over an identified virtual circuit connected to a CPE, e.g., CPE 32A from FIG. 1. Access node 40 may perform a generally reciprocal process when receiving an ATM OAM Loopback reply cell via ATM interfaces 44. Control unit 46 may construct an Ethernet OAM Loopback reply frame and may convert one or more fields of the ATM OAM Loopback reply cell to the Ethernet OAM Loopback reply frame. Access node 40 may then transmit the frame using one of Ethernet interfaces 42 via communication link 26 to an originating device, e.g. router 20 from FIG. 1.

As an example of the N:1 case, access node 40 may receive an Ethernet OAM Loopback frame via one or more of Ethernet interfaces 42. The Ethernet OAM Loopback frame may have a destination MAC address that is a unicast address of a particular CPE, such as CPE 32A. Interworking unit 48 may identify that the received Ethernet frame is an OAM Loopback frame. Interworking unit 48 may also determine that this is an N:1 case. Interworking unit 48 may determine VPI and VCI information from mapping information 52 based on the combination of the VLAN tags and the destination MAC address of the Ethernet frame. Interworking unit 48 may construct an ATM OAM End-to-End Loopback cell using the VPC and VPI information obtained from mapping information 52 and convert one or more fields between the received Ethernet OAM Loopback frame and the ATM OAM End-to-End Loopback cell. At least one of ATM interfaces 44 may receive the ATM OAM End-to-End Loopback cell constructed by interworking unit 48, and may transmit the ATM OAM End-to-End Loopback cell over an identified virtual circuit to an identified CPE, e.g., CPE 32A.

If access node 40 receives an ATM OAM Loopback reply cell, interworking unit 48 may convert the received cell to an Ethernet OAM Loopback reply frame and interworking unit 48 may determine a mapping from mapping information 52 between the VCI and VPI of the reply cell and the VLAN tags for the Ethernet OAM Loopback reply frame. Interworking unit 48 may further determine the source MAC address for the Ethernet OAM Loopback reply frame from state information 59. Interworking unit 48 may utilize the MAC address of the CPE as a source MAC address of the constructed Ethernet Loopback reply frame, which one or more of Ethernet interfaces 42 may transmit toward originating router 20 via communication link 26.

In the N:1 case, a specific unicast MAC address of a particular CPE, e.g., CPE 32A from FIG. 1, access node 40 is used as the destination address of the Ethernet OAM Loopback frame. Access node 40 may receive an Ethernet OAM Loopback frame and interworking unit 48 may construct an ATM OAM End-to-End Loopback cell. Access node 40 may determine an association between the VLAN tags and the destination MAC address included in the Ethernet OAM Loopback frame and the VCI/VPI of the virtual circuit connected to CPE 32A based on mapping information 52.

The destination MAC address from the Ethernet OAM Loopback frame, however, may not fit within the fields of the ATM OAM End-to-End Loopback cell but may still be needed by access node 40 when constructing and transmitting an Ethernet OAM Loopback reply frame to an originating router, e.g. router 20. In this case, access node 40 may store data that does not fit within the ATM cell as state information 59. Data from the Ethernet OAM Loopback frame that is stored as state information may include the destination MAC address, one or more type length values (TLVs), and/or any other data that may not fit within an ATM OAM End-to-End Loopback cell. Information stored in state information 59 may be associated with one or more identifiers of the ATM OAM End-to-End Loopback cell, such as the transaction ID and/or the VCI/VPI information, such that, when access node 40 receives an ATM OAM Loopback reply cell, access node 40 may determine any associated state information from state information 59 based on the one or more identifiers of the reply cell.

After storing any state information as state information 59, access node 40 may send the constructed ATM OAM End-to-End Loopback cell towards CPE 32A. CPE 32A may receive the ATM OAM End-to-End Loopback cell, and may construct an ATM OAM Loopback reply cell. CPE 32A may transmit the ATM OAM Loopback reply cell towards access node 40. Access node 40 may receive the ATM OAM Loopback reply cell, and may construct an Ethernet OAM Loopback reply frame based on mapping information 52 and state information 59.

In the 1:1 case, access node 40 may determine the source MAC address for the Ethernet OAM CFM reply frame from a value stored in a field of the ATM OAM CFM reply cell. In the N:1 case, upon receiving an ATM OAM Loopback reply cell, access node 40 may determine the source MAC address for the Ethernet OAM CFM reply frame from state information 59. Access node 40 may also determine values of other fields, such as TLVs, for the Ethernet OAM CFM reply frame from state information 59, and may append the field values to the Ethernet reply frame. Access node 40 may transmit the Ethernet OAM CFM reply frame towards an originating device, such as router 20. Access node 40 may remove any of state information 59 associated with the ATM OAM Loopback reply cell once the reply Ethernet OAM Loopback reply frame is sent.

Figure 3:
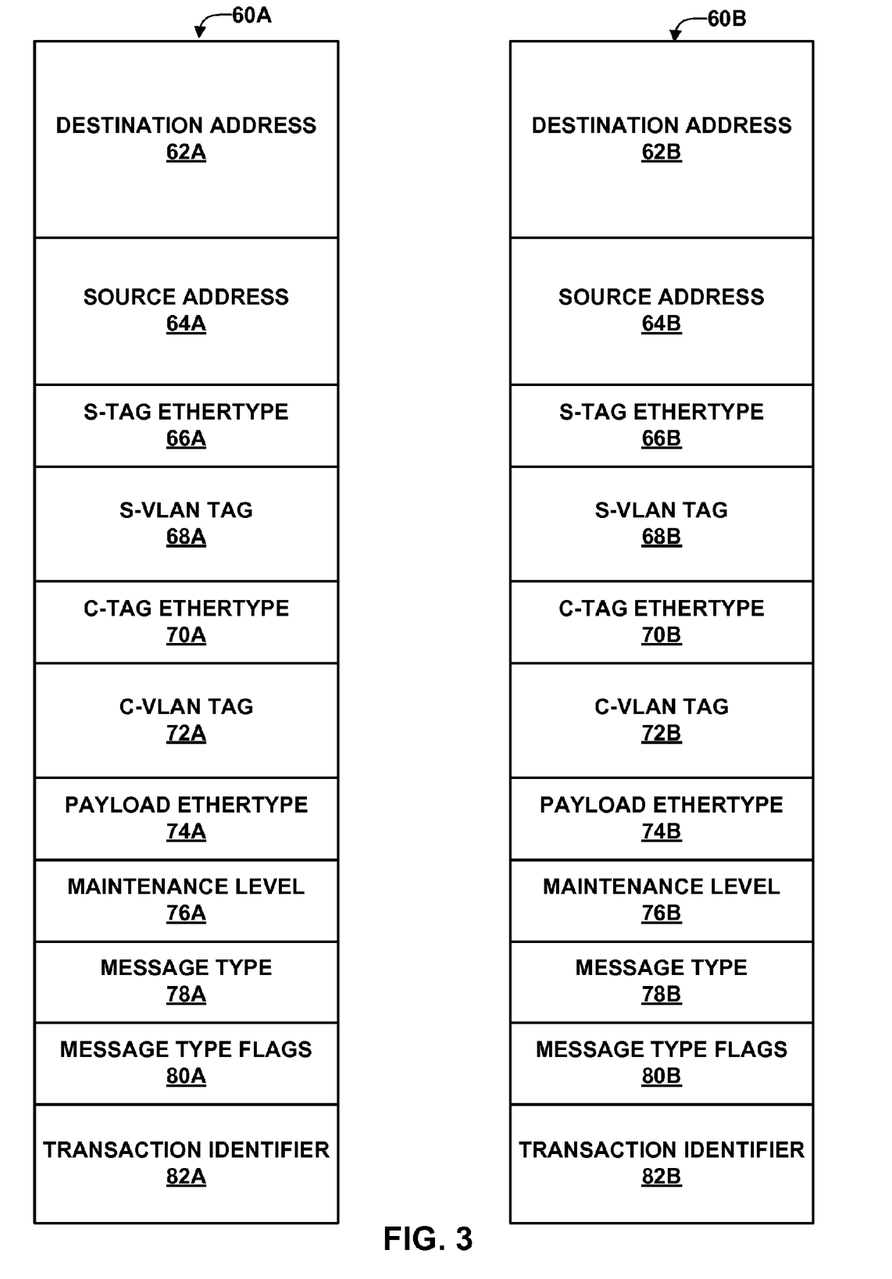
FIG. 3 is a conceptual diagram illustrating an Ethernet OAM Loopback frame, and an Ethernet OAM Loopback reply frame.

FIG. 3 is a conceptual diagram illustrating an Ethernet Loopback frame 60A and an Ethernet OAM Loopback reply frame 60B (collectively referred to as "frames 60"). The techniques of this disclosure primarily concern the interworking of Ethernet OAM Loopback frames and ATM OAM End-to-End Loopback cells and vice versa. Destination address fields 62A and 62B specify a destination media access control (MAC) address of a network device to which the frame is to be sent. In the 1:1 case of OAM loopback message frame 60A, the destination address may be a multicast address or a well-known unicast MAC address of an access node. The multicast address is defined in the IEEE 802.1ag standard to have the hexadecimal value of "01-80-C2-00-00-3y," where "y" is a number from 0-7 that indicates the MD level of the loopback message. The well-known unicast MAC address may be the unicast MAC address of an individual access node to which the destination CPE is connected.

In the case of using the multicast address, one or more access nodes may listen for incoming traffic with the multicast destination address. If an incoming frame to an access node has a destination MAC address that matches the multicast address, the access node may accept the frame and proceed to perform interworking for an end-to-end loopback test. In the case of using the access node unicast MAC address, the receiving access node may also perform interworking for an end-to-end loopback test if an incoming frame to the access node has a destination MAC address matching a unicast MAC address of the access node. Source address field 64A specifies a source MAC address for an originating device of Ethernet loopback frame 60A. In the example of FIG. 1, the Ethernet loopback frame may have a source address corresponding to a port of router 20.

In reply frame 60B, destination address field 62B may be the unicast MAC address of an originating device that sent the original Ethernet loopback message 60A, such as router 20 of FIG. 1. By having destination address field 62B include the address of the originating device, reply frame 60B may reach the network device that originated the Ethernet OAM frame. Similar to destination address field 62A, source address field 64B of loopback reply frame 60B may include the unicast MAC address of the access node or the multicast address.

OAM loopback frames 60 may also include one or more EtherType fields. An EtherType field may indicate that a protocol is encapsulated in a payload of an Ethernet frame. Each EtherType field may comprise a 16-bit Tag Protocol Identifier (TPID). Additionally, a value of the TPID of an EtherType field may be used to indicate the presence of one or more virtual local area network (VLAN) tags. In Ethernet networks, the value of a VLAN tag identifies a virtual network that an Ethernet frame belongs to. A VLAN is a group of network devices that may or more fields. In the illustrated example of FIG. 3, each of the frames 60 may communicate with each other as if they were on the same physical network. Generally, a VLAN-compatible device may associate each interface or port of the VLAN-compatible device with one or more VLANs.

Frames 60A and 60B may include S-TAG EtherType fields 66A and 66B, respectively, as well as and C-TAG EtherType fields 70A and 70B, respectively. Each of EtherType fields 66A and 66B may respectively indicate the presence of S-VLAN tags 68A and 68B. C-TAG EtherType fields 70A and 70B may respectively indicate the presence of C-VLAN tags 72A and 72B.

In the 1:1 and N:1 cases, when converting an Ethernet OAM CFM Loopback frame to an ATM OAM End-to-End Loopback cell according to the techniques of this disclosure, an outer VLAN tag, e.g. S-VLAN tag 68A, and an inner VLAN tag, e.g. C-VLAN TAG 72A may be used in routing an OAM loopback request from an originating device to a particular destination CPE on which to perform fault isolation.

The outer VLAN tag is referred to as an "S-TAG." In the example of FIG. 3, loopback frames 60A and 60B include S-TAGs 68A and 68B, respectively. The inner VLAN tag, referred to as a "C-TAG," may also be present. In the example of FIG. 3, loopback frame 60A and 60B include C-TAGs 72A and 72B, respectively. Each of VLAN tags 68 and 72 may comprise a 12-bit Virtual LAN Identifier (VID) field. A network device that receives one of loopback frames 60 may associate one of frames 60 with a particular VLAN based on the VIDs of S-VLAN tag 68A and C-VLAN tag 72A of frame 60A or S-VLAN tag 68B and C-VLAN tag 72B of FIG. 60B. In some examples, the VID fields may be included within a larger tag control information (TCI) field. A network device may associate a frame with a VLAN based on a VID field value.

In the 1:1 case, a VID of the S-TAG may specify a particular access node that the frame should be forwarded to, and the VID of the C-TAG may specify a particular CPE to receive the frame. The format may follow the recommendation of the Broadband Forum TR-101 technical report (Migration to Ethernet-Based DSL Aggregation) where the frame has an outer S-Tag VLAN identifying an access node and an inner C-Tag VLAN identifying the Subscriber and Service. The Broadband Forum TR-101 technical report is herein incorporated by reference Because, in the 1:1 case, the combination of the VIDs of the C-TAG and S-TAG identifies a particular CPE, the Ethernet OAM Loopback frame 60A may have a destination address 62A of a multicast address or a well-known unicast address of the access device. In particular, the multicast address may be the OAM multicast address or the unicast OAM MAC address of access node 40. That is, the originating device, e.g., router 20 from FIG. 1, does not need to know the destination MAC address of the specific CPE. Instead, the S-TAG and C-TAG included in the Ethernet OAM CFM frame may uniquely identify the specific CPE such that access node 40 may determine the VC connected to the CPE according to a mapping stored at access node 40.

In the N:1 case, a service provider network may have more than one customer to provide Ethernet OAM to ATM OAM capabilities. In this example, the combination of the VID of the S-TAG the VID of the C-TAG may identify a particular customer network and access node. In this example, there may be "N" CPEs within the customer network identified by a combination of the VIDs of the S-TAG and a C-TAG. In the N:1 case, additional information may be included in the Ethernet OAM Loopback frame 60A to identify a particular CPE. In some examples, the destination address 62A of the Ethernet OAM Loopback frame 60A may include a unicast MAC address of the particular CPE such that the access node may determine the VC connected to the particular CPE. An operator of a network may define associations between one or more VLANs and one or more ports or interfaces on a network device. For example, router 20 and/or Ethernet aggregator 24 from FIG. 1 may have ports or interfaces that are configured to be a part of the VLAN identified by the VIDs included in frames 60.

In the example of FIG. 3, S-TAG EtherType fields 66A and 66B may include EtherType information. The EtherType information may indicate that S-TAG fields, e.g. S-VLAN tag fields 70A and 70B are present. S-VLAN tag fields 68A and 68B comprise VIDs that associate frames 60A and 60B with a particular VLAN. In the example of FIG. 3, both fields 66A and 66B may have hexadecimal values "0x88A8" or other legacy S-TAG tag protocol identifier (TPID) values. C-TAG EtherType fields 72A and 72B may also include EtherType information. The EtherType information may indicate that C-TAG fields, e.g. C-VLAN Tag fields 72A and 72B are present. C-VLAN tag fields 72A and 72B comprise VIDs that may associate frames 60A and 60B with another particular VLAN. In the case of frame 60A, the values of the C-VLAN TAG and S-VLAN TAG fields may be used by an access node to determine a CPE on which to perform fault isolation.

In the example of FIG. 3, C-VLAN TAG 72A may have a VID of value 100. An access node receiving frame 60A may interpret the VID of field 72A and forward frame 60A over an interface associated with VID 100 to CPE 32A. In this example, access node 40 may examine the VID value of field 72A, which access node 40 may determine to have a VID value of 100. Interworking unit 48 of access node 40 may construct an ATM OAM End-to-End Loopback cell. Interworking unit 48 may determine the VPC/VPI information of the ATM OAM End-to-End Loopback cell from mapping information 52 based on the combination of the VID values of fields 68A and 72A. Access node 40 may forward the constructed ATM OAM End-to-End Loopback cell via one of ATM interfaces 44 to the CPE associated with the determined VCI/VPI information, such as CPE 32A.

Fields following EtherType fields 74A and 74B of FIG. 3 may comprise the payload of an Ethernet frame. In OAM frames, the payload include a maintenance level field, such as maintenance level fields 76A and 76B and a message type field, e.g. message type fields 78A and 78B, and message type flags fields 80A and 80B. Within maintenance level fields 76A and 76B, a 3-bit MEG (Maintenance Entity Group) level field identifies a MEG level of an OAM protocol data unit (PDU). A MEG group is a group of two or more associated maintenance equipment endpoints (MEPs). An MEP may be any device capable of initiating and terminating OAM packets for the purposes of fault isolation and CFM. Each MEG may have an associated level that indicates information about size and/or boundaries of the MEG. As an example, a lower level MEG may be a smaller network, whereas a higher MEG level may indicate a larger network, such as a service provider network. When there are multiple MEG levels, MEG traffic from a higher level may be carried by MEPs of a lower MEG level, but not vice versa. There is a nested relationship between higher and lower MEG levels. The higher the MEG level, the greater the network scope that is covered by the MEG level. Only MEPs with the same MEP level may interact with each other. In addition to the maintenance level, the maintenance level field also includes a 5-bit version field, which identifies the version of the OAM protocol.

In the example depicted in FIG. 3, Ethernet loopback message frame 60A and Ethernet loopback reply frame 60B may include maintenance level fields 76A and 76B, respectively. The maintenance level of fields 76A and 76B may be set to "3," which may indicate a "provider role," as defined in the Y.1731 standard. Fields 76A and 76B may also comprise a 5-bit version field, with a value of zero. Although illustrated as having a value of zero for the purposes of example, the version field may have other values ranging from 0 to 31, as well.

Frames 60A and 60B may also include one byte message type fields 78A and 78B, respectively. A portion of message type fields 78A and 78B, referred to as an "OpCode," indicates a particular message type, such as loopback, continuity check, etc., of the OAM PDU. As an example, frame 60A may have an OpCode value of "3," defined as a loopback message in the 802.1ag standard. Frame 60B may have an OpCode field value of "2," defined as a loopback reply message according to the 802.1ag standard.

Frames 60A and 60B also include message type flags fields 80A and 80B. The message type flags field is an 8-bit (one byte) field, the value of which is dependent on the type of OAM message. In the example depicted in FIG. 3, frames 60A and 60B are a loopback message and a loopback reply, respectively. According to the Y.1731 standard and as illustrated in FIG. 3, the flags field has a hexadecimal value of "0x00" for both loopback messages and loopback replies.

Ethernet Loopback frames 60A and 60B may also include a 4-byte loopback transaction identifier field, also referred to as a transaction identifier field. An originating device may set the value of the 4-byte field for a loopback message frame such that when the origination device receives a corresponding loopback reply, the originating device may be able to identify the original loopback message associated with the loopback reply. In the example of FIG. 3, frames 60A and 60B may include transaction identifier fields 82A and 82B. An originating device, such as router 20 of FIG. 1, may generate and send Ethernet loopback message frame 60A to a particular CPE. In the process of generating the loopback message, the originating device may generate a value for the 4-byte transaction identifier field 82A in order to identify any loopback reply messages received. If and when the originating device receives a loopback reply message, such as frame 60B, the originating device may be able to identify the loopback transaction associated with the loopback reply message, and one or more other additional characteristics of the loopback transaction based on the transaction identifier 82B.

A loopback message may also be formatted to contain optional Ethernet OAM type-length-values (TLVs) which may be variable length extending the OAM PDU to the maximum transmission unit (MTU) size of an Ethernet interface. Including TLVs may complicate the interworking operation since the Access Node would be required to maintain "state" for the ATM Loopback request as the ATM Loopback cell is not large enough to contain the optional Ethernet OAM TLVs.

In some examples, such as the 1:1 case, this disclosure generally describes techniques in which the Access Node does not maintain "state," but copies all essential information into the ATM OAM Loopback cell transmitted to the CPE. In other examples, such as the N:1 case, the access node may maintain state to store additional data from the Ethernet OAM CFM Loopback frame that is not translated into the ATM OAM End-to-End Loopback cell. For example, in the N:1 case, the access node may store the destination MAC address of the specific CPE to which the ATM OAM End-to-End Loopback cell is transmitted. The MAC address used to identify the specific CPE in the N:1 case cannot fit within the frame structure of the ATM OAM Loopback cell. The access node, therefore, stores the MAC address and, upon receiving an ATM OAM Loopback reply cell, generates an Ethernet OAM Loopback reply frame that includes the stored MAC address of the specific CPE as the source address for the reply frame.

In another example where an Ethernet OAM Loopback frame is transmitted to an access node and converted to an ATM OAM End-to-End Loopback cell, the Ethernet frame may include a number of additional TLVs. The additional TLVs may not fit within the cell structure of the ATM OAM End-to-End Loopback cell. Access node 40 may therefore save one or more of the TLVs in state information 59 of access node 40 of FIG. 2. Access node 40 may later retrieve the TLVs and/or other values stored in state information 59 and convert the state information into one or more fields of a constructed Ethernet OAM Loopback reply frame for transmission to the originating router.

Figure 4:
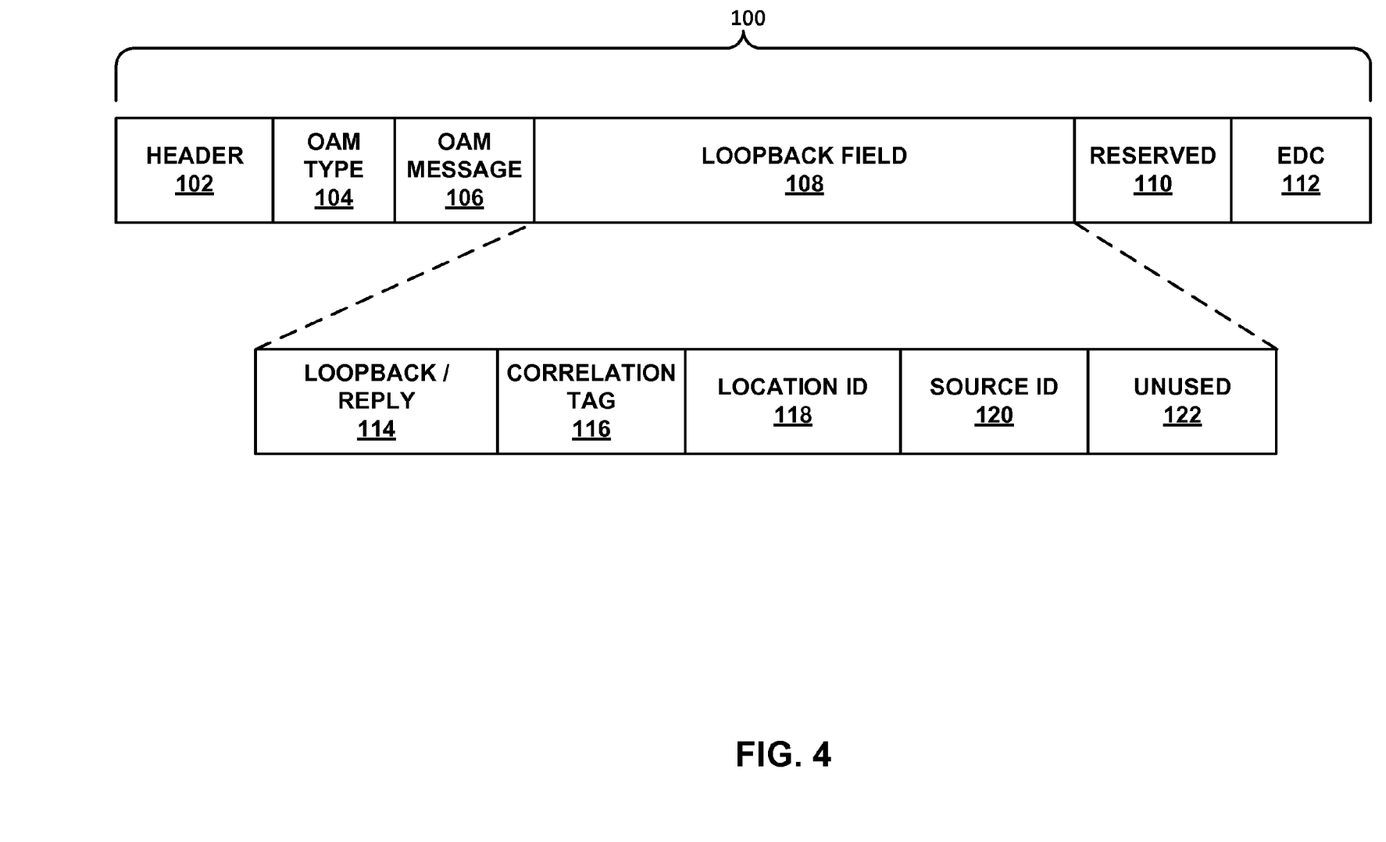
FIG. 4 is a conceptual diagram illustrating an ATM OAM End-to-End Loopback cell, e.g. a loopback message or a loopback reply message.

FIG. 4 is a conceptual diagram illustrating an ATM OAM End-to-End Loopback cell, e.g. a loopback message or a loopback reply message. In accordance with the techniques of this disclosure, an access node may receive an Ethernet OAM Loopback frame and convert it to an ATM OAM End-to-End Loopback cell, and forward that cell to a CPE identified by the VID values of a C-TAG and an S-TAG. The example depicted in FIG. 4 illustrates the basic structure of an ATM OAM End-to-End Loopback cell. Cell 100 may be divided into one or more fields, which may be further subdivided into additional sub-fields. In some examples, one or more of the fields and/or sub-fields illustrated in FIG. 4 may generally correspond to one or more fields and/or sub-fields of an Ethernet OAM CFM frame.

In the example of FIG. 4, ATM OAM End-to-End Loopback cell 100 includes a 5-byte header 102, a 4-bit OAM type field 104, a 4-bit OAM message 106, a 45-byte loopback field 108, a 6-bit reserved field 110, and a 10-bit EDC (Error Detection Code) field 112. Header 102 may comprise a standard UNI (User-Network Interface) or NNI (Network-Network Interface) ATM cell header, which may include virtual path identifier (VPI), virtual channel identifier (VCI), payload type, and header error control fields. The VPI, VCI, payload type, and header error control fields are illustrated in greater detail in FIG. 5.

Header 102 includes VPI and VCI fields. The values of the VPI and VCI fields may specify a virtual circuit connected to a destination CPE for ATM OAM End-to-End Loopback cell 100, e.g. CPE 32A. For example, as illustrated in FIG. 2, access node 40 may identify the VCI/VPI information for cell 100 from mapping information 52 of access node 40 based on a subscriber device identifier of an Ethernet OAM CFM Loopback frame.

ATM OAM End-to-End Loopback cell 100 may include a 4-bit OAM type field 104, which in conjunction with a value of OAM message field 106, may indicate the type of OAM message of ATM OAM End-to-End Loopback cell 100. To indicate a loopback message, OAM type field 104 has binary value "0b0001," and OAM message field 106 has value "0b1000."

Loopback field 108 may comprise a number of sub-fields that are specific to a loopback message. In an example, loopback field 108 may be padded with repeated values of hexadecimal value "0x6a." In an example where cell 100 comprises a loopback message or loopback reply message, loopback field 108 may include a number of sub-fields including 1-byte loopback/reply field 114, 4-byte correlation tag field 116, 16-byte location ID field 118, an optional 16-byte source ID field 120, and an 8-byte unused field 122. Loopback/reply field 114 may indicate whether the loopback message has been received by a device, such as a CPE 32A. The first seven unused bits of loopback/reply field 114 may not indicate anything. However, the last bit may indicate whether the cell is a loopback message or a loopback reply message. If last bit is set to "0," the cell is a loopback reply message. If the last bit is set to "1," the cell is a loopback message.

Correlation tag field 116 may be used by an originating device, such as router 20, to correlate loopback commands with loopback responses. Much like loopback transaction identifier fields 82A and 82B of FIG. 3, an originating device may generate a value for correlation tag field 116 for the purposes of identifying loopback responses associated with the loopback message having the same transaction ID field value. Loopback field 108 may also include location ID field 118. The value of location ID field 118 may identify a virtual connection or connection segment where the loopback function is to occur. According to the ITU-T I.610 standard, one value of a location ID field, such as location ID field 18 may contain "all 1s" (that is, 16 bytes of hexadecimal value "0xFF"). An all 1s value signifies that the segment receiving the ATM OAM loopback cell is the segment for loopback. According to the techniques of this disclosure, when an ATM OAM CFM cell is a loopback cell, the location ID field may be set to all 1s, such that a CPE receiving the ATM OAM loopback cell responds with an ATM OAM loopback reply cell.

Function specific field 108 may further include Source ID field 120. A Source ID field is an optional field according to the I.610 standard. However, according to the techniques of this disclosure, an access node, e.g. access node 40, may insert one or more values into source ID field 120 in order to generate an end-to-end loopback message. In accordance with the techniques of this disclosure, access node 40 may convert information of an Ethernet OAM Loopback frame, such as VLAN tags, source MAC address, and maintenance level information, into source ID field 120 of ATM OAM End-to-End Loopback cell 100. Similarly, if access node 40 receives a loopback reply cell, access node 40 may convert the data stored in source ID field 120 to one or more fields of an Ethernet OAM Loopback reply frame. In an example, access node 40 or another network device may fill any unused space in the source ID field with a pad hexadecimal value of "0x6A." Loopback field 108 may further include an 8-byte unused field 122. Unused field 122 may also comprise 8 bytes of hexadecimal value "0x6A."

ATM OAM End-to-End Loopback cell 100 may further include a 6-bit reserved field 110, which, according to the I.610 standard, is reserved for future use and expansion. As long as the coding scheme for the reserved field is not defined, the value of a reserved field, such as reserved field 110 may be all "0s," that is, a binary value of "0b000000." Cell 100 may further include EDC (Error Detection Code) field 112. Error detection code 112 may calculate a CRC-10 (cyclic redundancy check) according to the I.610 standard, to verify integrity of the payload of cell 100.

Figure 5:
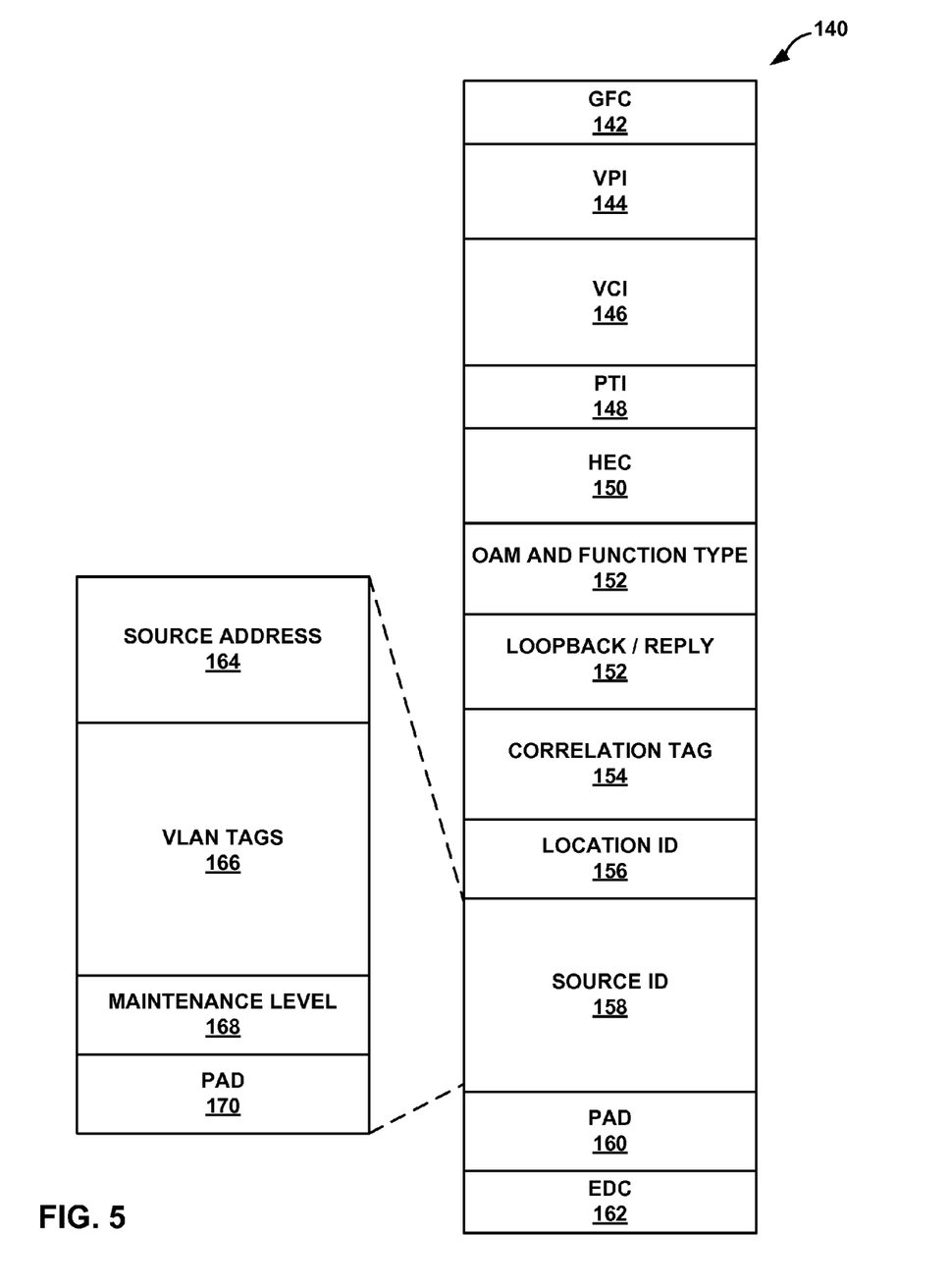
FIG. 5 is a conceptual diagram illustrating an ATM OAM End-to-End Loopback cell including data from one or more fields of an Ethernet OAM Loopback frame in accordance with the techniques of this disclosure.

FIG. 5 is a conceptual diagram illustrating an ATM OAM End-to-End Loopback cell 140 including data from one or more fields of an Ethernet OAM Loopback frame in accordance with the techniques of this disclosure. ATM OAM End-to-End Loopback cell 140 is divided into multiple fields. As illustrated in FIG. 5, an ATM OAM End-to-End Loopback cell may include a generic flow control (GFC) field 142, virtual path identifier (VPI) field 144, virtual channel identifier (VCI) field 146, payload type indicator (PTI) field 148, and header error correction (HEC) field 150. Loopback message cell 140 is illustrated as complying with the UNI format. However, in some examples, an ATM OAM loopback cell may utilize an NNI ATM cell format, which replaces the 4-bit GFC field with an additional 4-bit VPI field.

FIG. 5 illustrates an example of the techniques set forth in this disclosure, which include converting fields of an Ethernet OAM Loopback frame to an ATM OAM End-to-End Loopback cell, and vice versa. ATM OAM End-to-End Loopback cell 140 includes source ID field 158. The source ID field 158 is an optional field. According the techniques described in this disclosure, access node 40 uses the optional source ID field 158 to construct an ATM OAM End-to-End Loopback cell. More specifically, interworking unit 48 of access node 40 may convert the source MAC address, VLAN tags, and MD Level/Version fields of an Ethernet OAM CFM Loopback frame to corresponding sub-fields in source ID field 158 field of ATM OAM loopback cell 140. In this example, when access node 40 receives an ATM OAM reply cell, such as ATM OAM Loopback reply cell 140, access node 40 may construct an Ethernet OAM Loopback reply frame, and may convert the values stored in source ID field 158 (source MAC address, VLAN tags, and MD Level/Version) to the corresponding fields in the Ethernet OAM Loopback reply frame.

In the example of FIG. 5, source ID field 158 is illustrated as comprising source address field 164, VLAN tags field 166, maintenance level field 168, and pad field 170. Source address field 164 may generally comprise the converted source MAC address of an originating device, e.g. router 20, obtained from the Ethernet OAM Loopback frame. VLAN tags field 166 may generally comprise the converted S-TAG and C-TAG and EtherType fields of the Ethernet OAM Loopback frame. Maintenance level field 168 may generally comprise the maintenance level and field converted from the Ethernet OAM Loopback frame, and pad field 170 may comprise padding with hexadecimal value "0x6a" of any unused portions of source ID field 158.

Fields 142, 144, 146, 148, and 150 may generally comprise a header of an ATM cell. The GFC (Generic Flow Control) field 142 is a 4-bit field that may generally be used for flow control/sub-multiplexing between users of an ATM system. The next byte of cell 140 comprises VPI field 144 and the next two bytes of cell 140 comprise VCI field 146. The VPI and VCI field together identify a virtual circuit (VC) used by an ATM connection. When an access node receives an Ethernet OAM CFM Loopback frame and converts the frame to an ATM OAM End-to-End Loopback cell according to the techniques of this disclosure, access node 40 may identify the VPI and VCI field values for the cell based on an identifier of a destination CPE of the Ethernet OAM frame, which may include the VLAN tags of the Ethernet frame in a 1:1 case, or the combination of the VLAN tags and the destination MAC address of the frame in an N:1 case.

The next 4 bits of cell 140 comprise a PTI 148. The most significant three bits of PTI field 148 may comprise the payload type. The value of the PTI field may generally indicate whether an ATM OAM cell is an end-to-end OAM cell (PTI="0b101"), or a segment OAM cell (PTI="0b100"), as defined in the I.610 recommendation. In the example of FIG. 5, cell 140 may be a loopback message cell, which is a type of end-to-end cell, so the PTI field may be set to "0b101." The least significant bit of PTI field 148 may comprise a CLP (Cell Loss Priority) bit. The cell loss priority bit may indicate whether a cell is eligible to be dropped. In the example of FIG. 5, the cell loss priority bit is set to "0." In some examples, the cell loss priority bit may also be set to "1." The header of loopback message cell 140 may also include a one byte HEC (Header Error Correction) field 150, which carries an error correction value according to an 8-bit cyclic redundancy check (CRC) polynomial.

All fields that come after HEC field 150 may generally be referred to as being part of a payload of an ATM cell. As described above with respect to FIG. 4, an ATM OAM Loopback cell may include a one byte OAM and Function type field, such as OAM and Function type field 152. In the example of FIG. 5, OAM and function type field 152 may comprise both an OAM type field and a function type field, e.g. OAM type field 104 and OAM message field 106 of FIG. 4. In the example of FIG. 5, the OAM type is set to '0b0001' and the function type is set to '0b1000.' This OAM type/function type combination indicates that ATM OAM Loopback cell 140 is performing a loopback function (either a loopback message or loopback reply message). In other examples, the OAM type and function type fields may vary to indicate a different OAM message type.

ATM OAM Loopback cell 140 also includes loopback/reply field 152. The value of loopback/reply field 152 indicates whether cell 140 is a loopback request or a reply. Loopback/reply field 152 has value of '0b00000001' in the example of FIG. 5. The value of loopback indication field 152 indicates that cell 140 is a loopback message cell.

In the example of FIG. 5, ATM OAM loopback message cell 140 may include correlation tag 154 and location ID 156. As part of interworking between an Ethernet OAM loopback frame and an ATM OAM End-to-End Loopback cell 140, access node 40 may copy the values of the transaction ID from the Ethernet OAM loopback message to correlation tag field 154 of loopback message cell 140. A network device receiving a loopback message reply may associate the reply with the original loopback message based on the value of correlation tag field 154. ATM OAM loopback message cell 140 also includes location ID 156. In the example of FIG. 5, the value of loopback location ID 156 is set to all 1s, that is, sixteen bytes of hexadecimal value "0xff," indicating that a current segment is the segment endpoint for segment loopback, as defined in I.610.

ATM OAM loopback message cell 140 further includes Pad field 160. Pad field 160 is filled with 8 bytes of hexadecimal value "0x6a." ATM OAM loopback message cell 140 further includes a 2-byte EDC (Error Detection Code) 10 field 162.

According to the techniques of this disclosure, a computing device, such as access node 40 of FIG. 2, may interwork between Ethernet OAM Loopback frames and ATM OAM End-to-End Loopback cells. More specifically, access node 40 may convert an Ethernet OAM Loopback frame, such as Ethernet frame 60A from FIG. 3, to an ATM OAM End-to-End Loopback cell, such as ATM OAM End-to-End Loopback cell 140, and vice versa. In the process of converting between the Ethernet OAM Loopback frame and the ATM OAM End-to-End Loopback cell, access node 40 may convert one or more fields of the Ethernet OAM End-to-End Loopback frame to one or more fields of the ATM OAM End-to-End Loopback cell. In another example, access node 40 may receive an ATM OAM Loopback cell, such as a loopback reply cell. Access node 40 may convert the ATM OAM Loopback reply cell to an Ethernet OAM Loopback reply frame in a process that is generally reciprocal to converting from an Ethernet OAM Loopback frame to an ATM OAM End-to-End Loopback cell.

As mentioned above, access node 40 may translate between one or more fields of the Ethernet OAM Loopback frame and one or more fields of the ATM OAM End-to-End Loopback cell. According to the techniques of this disclosure, the fields involved in the translation are as follows in Table 1, below.

TABLE 1

| Ethernet OAM field | Size (bytes) | ATM OAM field | Size (bytes) | Description |
|---|---|---|---|---|
| Source MAC | 6 | Source ID | 16 | Used for return Destination Address |
| Transaction ID | 4 | Correlation Tag | 4 | Uniquely identifies this transaction |
| One or more VLAN Tags (Ethertype + VID) | Nx4 | Source ID | 16 | Uniquely identifies Ethernet flow |

TABLE 1-continued

| Ethernet OAM field | Size (bytes) | ATM OAM field | Size (bytes) | Description |
|---|---|---|---|---|
| Maintenance Level and Version | 1 | Source ID | 16 | Uniquely identifies Ethernet Maintenance Level and Version |

Table 1 includes conversions between fields of an Ethernet OAM Loopback frame and fields of an ATM OAM End-to-End Loopback cell, as well as the corresponding size in bytes of each field, and a description of what each field identifies. When a network device, such as access node 40 converts between an Ethernet OAM Loopback frame and an ATM OAM End-to-End Loopback cell, access node 40 may convert the values of the source MAC address, one or more VLAN tags (including EtherType fields associated with the VLAN tags), and the maintenance level and version into the source ID field of the ATM OAM End-to-End Loopback cell. Additionally, access node 40 may convert the transaction ID into the correlation tag field of the ATM OAM End-to-End Loopback cell.

When access node 40 converts between an ATM OAM Loopback reply cell, and an Ethernet OAM Loopback reply frame, access node 40 may perform a generally reciprocal process. Access node 40 may take the MAC address value stored in the Source ID field of the ATM OAM Loopback reply cell, and convert the value to the destination MAC address field of the Ethernet OAM Loopback reply frame. Access node 40 may also convert the values of the one or more VLAN tags (including the associated EtherType information) and insert the tag values before the payload of the Ethernet OAM Loopback reply frame. Access node 40 may additionally take the value of the Maintenance Level and Version stored in the Source ID of the ATM OAM Loopback reply cell and translate the value to the Maintenance Level/Version field of the Loopback reply Ethernet frame. Access node 40 may further store the correlation tag value of the ATM OAM Loopback reply cell in the transaction ID of the Ethernet OAM Loopback reply field.

In some examples, an access node, such as access node 40 from FIG. 2, that interworks between Ethernet OAM Loopback frames and ATM OAM End-to-End Loopback cells may maintain associations between VID and VC information, e.g. VPC/VPI information of destination CPEs, such as CPE 32A. Access node 40 may store the associations in mapping information 52 from FIG. 2. Access node 40 may maintain the associations such that when access node 40 receives an Ethernet OAM CFM frame, access node 40 may determine the VCI/VPI information for a corresponding ATM OAM Loopback cell from the VLAN tags of the Ethernet frame.

In another example, access node 40 may be setup in an N:1, or many-to-one services, case. In the N:1 case, access node 40 may maintain state information, that is, store data associated with an Ethernet OAM Loopback frame that cannot be translated into the Source ID field of an ATM OAM Loopback cells. In some examples, the state information may comprise a destination MAC address of a destination subscriber device, such as CPE 32A. Access node 40 may store the state information in state information 59 from FIG. 2. In an example, access node 40 may receive an Ethernet OAM Loopback frame and may convert between the Ethernet OAM Loopback frame and ATM OAM Loopback cell. When converting from an Ethernet OAM Loopback frame to an ATM OAM Loopback cell, access node 40 may store the destination MAC address of the subscriber device in state information 59 from FIG. 2. Access node 40 may also use the VLAN tags and the destination MAC address included in the Ethernet OAM Loopback frame to determine the VCI/VPI information of a VC connected to the subscriber device from mapping information 52. Access node 40 may transmit the ATM OAM Loopback cell to the subscriber device, e.g., CPE 32A.

Access node 40 may later receive an ATM OAM Loopback reply cell that originates from the subscriber devices, e.g., CPE 32A. Upon receiving the reply cell, access node 40 may construct an Ethernet OAM Loopback reply frame and may convert between the ATM OAM Loopback reply cell and the Ethernet OAM Loopback reply frame. As part of the conversion between the ATM OAM Loopback reply cell and the Ethernet OAM Loopback reply frame, access node 40 may retrieve the destination MAC address of the subscriber device previously stored in state information 59. Access node 40 may use an index value, e.g., based on the VPI/VCI information for the subscriber device or the transaction ID, to retrieve the MAC address stored in state information 59. Access node 40 may set the source MAC address of the reply frame to the MAC address of the subscriber device retrieved from state information 59. Access node 40 may translate the information stored in the Source ID field of the ATM OAM Loopback reply cell into the destination MAC address, VLAN tags, and maintenance level fields of the Ethernet OAM ATM Loopback reply frame. Access node 40 may then transmit the constructed Ethernet OAM Loopback reply frame toward the originating device identified by the destination MAC address, such as router 20 from FIG. 1. Once the Ethernet OAM Loopback reply frame is sent to router 20, access node 40 may discard the state information associated with the Ethernet OAM Loopback reply frame.

In some examples, access node 40 may also store information related to one or more TLVs of an Ethernet OAM Loopback frame in state information 59. In general, an Ethernet Loopback frame may not have TLVs, but in some cases, an operator of a service provider network may wish to include optional TLVs in a Loopback frame. In a case where access node 40 receives an Ethernet OAM Loopback frame with TLVs, and the size of that message when converted from a frame to an ATM cell would be greater than the size of an ATM cell (i.e., 53 bytes), access node 40 may store at least part of the TLVs in state information 59. If access node 40 receives a related ATM OAM Loopback reply cell, access node 40 may construct an Ethernet OAM Loopback reply frame and may retrieve TLVs associated with the ATM OAM Loopback reply cell from state information 59. Access node 40 may insert the retrieved TLVs into the constructed Ethernet OAM Loopback reply frame and may transmit the constructed frame toward an originating device, such as router 20 from FIG. 1.

Figure 6:
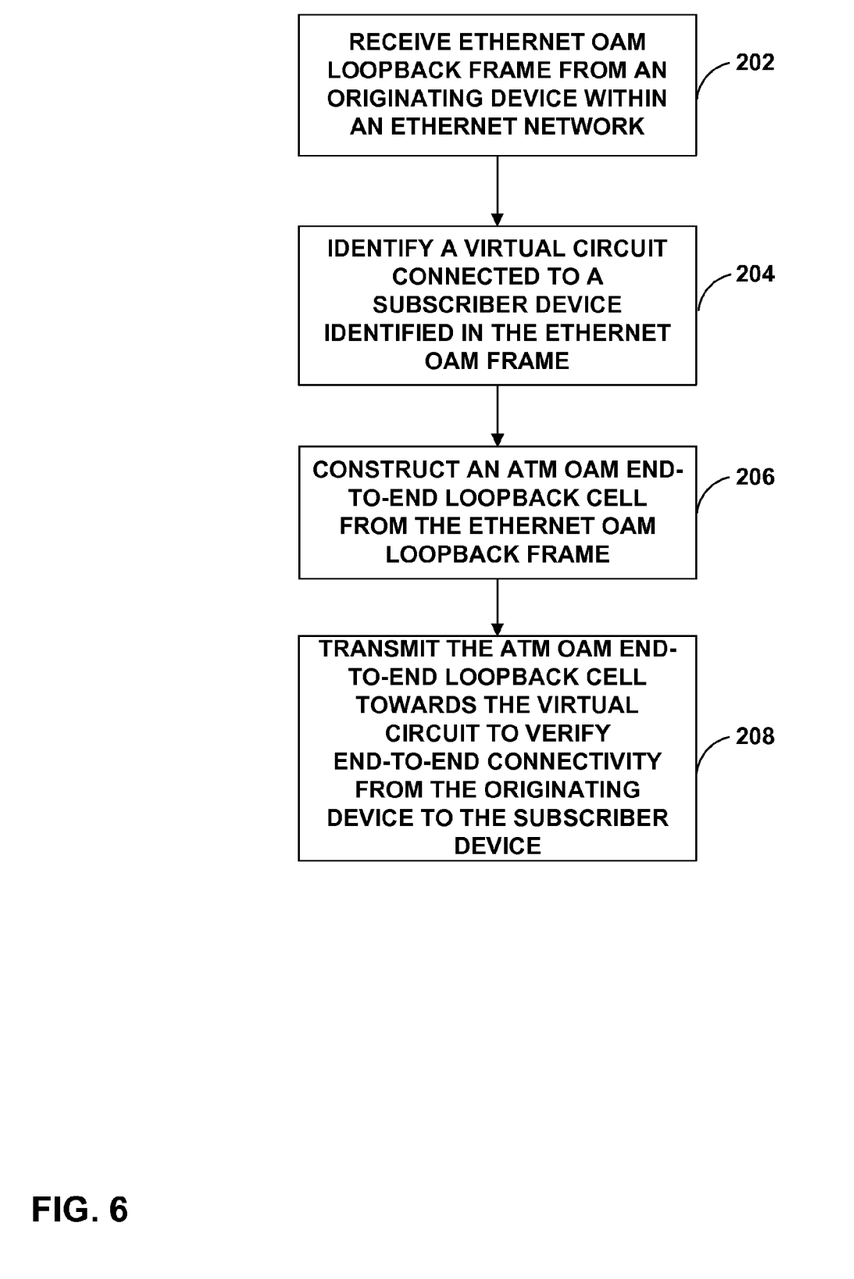
FIG. 6 is a flow chart illustrating an example method of interworking between an Ethernet OAM Loopback frame and an ATM OAM End-to-End Loopback cell in accordance with the techniques of this disclosure.

FIG. 6 is a flow chart illustrating an example method of interworking between an Ethernet OAM Loopback frame and an ATM OAM End-to-End Loopback cell in accordance with the techniques of this disclosure. For the purposes of example, the techniques of FIG. 6, are described with respect to access node 40 of FIG. 2, although it should be understood that any other network device capable of interworking between an Ethernet OAM Loopback frame and an ATM OAM End-to-End Loopback cell may also be configured to perform the method of FIG. 6.

Access node 40 may receive an Ethernet OAM Loopback frame from an originating device, e.g. router 20 from FIG. 1, within an Ethernet network, e.g. service provider network 34 of FIG. 1 (202). Access node 40 may receive the Ethernet OAM Loopback frame via an Ethernet interface, such as one or more of Ethernet Interfaces 42 of FIG. 2. Access node 40 may further identify virtual circuit information for a subscriber device, e.g. CPE 32A of FIG. 1, from mapping information 52 of access node 40, based on a subscriber device identifier included in the Ethernet OAM CFM Loopback frame (204). Mapping information 52 may associate an identifier of the subscriber device included in the Ethernet OAM Loopback frame with the virtual circuit connected to the subscriber device.

Access node 40 may construct an ATM OAM End-to-End Loopback cell from the Ethernet OAM Loopback frame (206). Interworking unit 48 may translate data included in one or more fields of the Ethernet OAM Loopback frame into at least one field of the ATM OAM End-to-End Loopback cell, including a source MAC address field, one or more VLAN tag fields, and a maintenance level field, into a source ID field of the ATM OAM End-to-End Loopback cell. In an example, access node 40 may not translate at least one of the fields in the Ethernet OAM Loopback frame into a field of the ATM OAM End-to-End Loopback cell. Access node 40 may store some of the non-translated data, such as TLVs, in state information 59 from FIG. 2. Interworking unit 48 may also pad unused bits of the source ID field of the ATM OAM End-to-End Loopback cell when translating between fields of the Ethernet OAM Loopback frame and the ATM OAM End-to-End Loopback cell.

In an example of a one-to-one (1:1) service, the subscriber device identifier, e.g. information that identifies a subscriber device CPE 32A to access node 40, may comprise virtual local area network (VLAN) tags associated with access node 40 and CPE 32A included in the Ethernet OAM Loopback frame. In addition, the destination MAC address of the Ethernet OAM Loopback frame may comprise a well-known unicast MAC address or a multicast address. In the example of a many-to-one (N:1) service, the subscriber device identifier may comprise the VLAN tags and a specific unicast MAC address of CPE 32A.

After receiving an Ethernet OAM Loopback frame and translating the Ethernet OAM Loopback frame into an ATM OAM End-to-End Loopback cell, access node 40 may use mapping information 52 to identify the virtual circuit (VC) connected to CPE 32A based on the subscriber device identifier included in the Ethernet OAM Loopback frame. In the 1:1 case, access node 40 may identify the VC associated with CPE 32A based on the VLAN tags included in the Ethernet OAM Loopback frame. In the N:1 case, access node 40 may identify the VC of CPE 32A based on a destination MAC address of the subscriber device included in the Ethernet frame and the VLAN tags of the Ethernet frame. In either case, access node 40 may then transmit the ATM OAM End-to-End Loopback cell toward a virtual circuit (VC) connected to a subscriber device to verify end-to-end connectivity from the originating device, e.g., router 20, to the subscriber device, e.g., CPE 32A (208).

Access node 40 may further receive an ATM OAM Loopback reply cell from CPE 32A. The ATM OAM Loopback reply cell may generally be sent in response to the ATM OAM End-to-End Loopback cell that access node 40 previously sent. Access node 40 may receive the ATM OAM Loopback reply cell and may construct an Ethernet OAM Loopback reply frame from the ATM OAM Loopback reply cell. Access node 40 may transmit the frame towards the device that sent the originating Ethernet OAM End-to-End Loopback frame via an interface, such as one of Ethernet interfaces 42.

Although illustrated as being performed in a specific order, the steps of FIG. 6 may generally be performed in any order or in parallel. Although described as being performed by a network device, such as access node 40 from FIG. 2, the techniques of FIG. 6 may be performed by any network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various aspects of the disclosure have been described. These and other aspects are within the scope of the following claims.

What is claimed is:

1. A method comprising:
receiving, with an access node, an Ethernet operations, administration, and maintenance (OAM) Loopback frame from an originating device within an Ethernet network;
constructing, with the access node, an Asynchronous Transfer Mode (ATM) OAM End-to-End Loopback cell from the Ethernet OAM Loopback frame; and
transmitting the ATM OAM End-to-End Loopback cell from the access node towards a virtual circuit connected to a subscriber device within an ATM network to verify end-to-end connectivity from the originating device within the Ethernet network to the subscriber device within the ATM network,
wherein constructing the ATM OAM End-to-End Loopback cell from the Ethernet OAM Loopback frame comprises translating data from one or more fields of the Ethernet OAM Loopback frame into a source identification (ID) field of the ATM OAM End-to-End Loopback cell.

2. The method of claim 1, wherein constructing the ATM OAM End-to-End Loopback cell from the Ethernet OAM Loopback frame comprises translating data included in one or more fields of the Ethernet OAM Loopback frame into at least one field of the ATM OAM End-to-End Loopback cell.

3. The method of claim 2, wherein data included in at least one of the fields in the Ethernet OAM Loopback frame is not translated into a field of the ATM OAM End-to-End Loopback cell, further comprising storing the data at the access node.

4. The method of claim 1, wherein constructing the ATM OAM End-to-End Loopback cell from the Ethernet OAM Loopback frame comprises translating data from a source media access control (MAC) field, one or more virtual local area network (VLAN) tag fields, and a maintenance level field of the Ethernet OAM Loopback frame into the source identification (ID) field of the ATM OAM End-to-End Loopback cell.

5. The method of claim 4, wherein constructing the ATM OAM End-to-End Loopback cell from the Ethernet OAM Loopback frame further comprises padding unused bits of the source ID field of the ATM OAM End-to-End Loopback cell.

6. The method of claim 1, further comprising:
receiving, with the access node, an ATM OAM Loopback reply cell from the subscriber device;
constructing, with the access node, an Ethernet OAM Loopback reply frame from the ATM OAM Loopback reply cell; and
transmitting the Ethernet OAM Loopback reply frame from the access node towards the originating device within the Ethernet network.

7. The method of claim 6, further comprising:
translating data from the source identification (ID) field of the ATM OAM Loopback reply cell into a destination media access control (MAC) field, one or more virtual local area network (VLAN) tag fields, and a maintenance level field of the Ethernet OAM Loopback reply frame.

8. The method of claim 1, further comprising:
storing, with the access node, mapping information that associates an identifier of the subscriber device with the virtual circuit connected to the subscriber device; and
identifying the virtual circuit connected to the subscriber device from the mapping information based on the subscriber device identifier included in the Ethernet OAM Loopback frame.

9. The method of claim 8, wherein for a one-to-one service, the subscriber device identifier comprises a virtual local area network (VLAN) tag associated with the subscriber device.

10. The method of claim 8, wherein, for a many-to-one service, the subscriber device identifier comprises a media access control (MAC) address of the subscriber device.

11. The method of claim 1, wherein the ATM network comprises one of a passive optical network (PON) and an active optical network.

12. The method of claim 1, wherein, for a many-to-one service, a destination media access control (MAC) address field of the Ethernet OAM Loopback frame includes a specific unicast MAC address of the subscriber device.

13. The method of claim 1, wherein, for a one-to-one service, a destination media access control (MAC) address field of the Ethernet OAM Loopback frame includes one of a unicast MAC address of the access node and a multicast address.

14. An access node comprising:
   an Ethernet interface that receives an Ethernet operations, administration, and maintenance (OAM) Loopback frame from an originating device within an Ethernet network;
   a control unit that constructs an Asynchronous Transfer Mode (ATM) OAM End-to-End Loopback cell from the Ethernet OAM Loopback frame; and
   an ATM interface that transmits the ATM OAM End-to-End Loopback cell from the access node towards a virtual circuit connected to a subscriber device within an ATM network to verify connectivity from the originating device within the Ethernet network to the subscriber device within the ATM network,
   wherein to construct the ATM OAM End-to-End Loopback cell from the Ethernet OAM Loopback frame, the control unit is configured to translate data from one or more fields of the Ethernet OAM Loopback frame into a source identification (ID) field of the ATM OAM End-to-End Loopback cell.

15. The access node of claim 14, wherein the control unit translates data included in one or more fields of the Ethernet OAM Loopback frame into at least one field of the ATM OAM End-to-End Loopback cell to construct the ATM OAM End-to-End Loopback cell from the Ethernet OAM Loopback frame.

16. The access node of claim 15, wherein the control unit does not translate data included in at least one of the fields in the Ethernet OAM Loopback frame into a field of the ATM OAM End-to-End Loopback cell, and wherein the control unit further stores the data at the access node.

17. The access node of claim 14, wherein the control unit translates data from a source media access control (MAC) field, one or more virtual local area network (VLAN) tag fields, and a maintenance level field of the Ethernet OAM Loopback frame into the source identification (ID) field of the ATM OAM End-to-End Loopback cell to construct the ATM OAM End-to-End Loopback cell from the Ethernet OAM Loopback frame.

18. The access node of claim 17, wherein the access node constructs the ATM OAM Loopback cell from the Ethernet OAM Loopback frame, and wherein constructing the ATM OAM End-to-End Loopback cell further comprises padding unused bits of the source ID field of the ATM OAM End-to-End Loopback cell.

19. The access node of claim 14,
   wherein the ATM interface receives an ATM OAM Loopback reply cell from the subscriber device,
   wherein the control unit constructs an Ethernet OAM Loopback reply frame from the ATM OAM reply cell, and
   wherein the Ethernet interface transmits the Ethernet OAM Loopback reply frame from the access node towards the originating device within the Ethernet network.

20. The access node of claim 19, wherein the control unit translates data from the source identification (ID) field of the ATM OAM Loopback reply cell into a destination media access control (MAC) field, one or more virtual local area network (VLAN) tag fields, and a maintenance level field of the Ethernet OAM Loopback reply frame.

21. The access node of claim 14, wherein the control unit stores mapping information that associates an identifier of the subscriber device with the virtual circuit connected to the subscriber device, and identifies the virtual circuit connected to the subscriber device from the mapping information based on the subscriber device identifier included in the Ethernet OAM Loopback frame.

22. The access node of claim 21, wherein for a one-to-one service, the subscriber device identifier comprises a virtual local area network (VLAN) tag associated with the subscriber device.

23. The access node of claim 21, wherein for a many-to-one service, the Ethernet OAM Loopback frame includes a destination media access control (MAC) address that comprises a specific unicast MAC address of the subscriber device.

24. The access node of claim 14, wherein the ATM network comprises one of a passive optical network (PON) and an active optical network.

25. The access node of claim 14, wherein, for a many-to-one service, a destination media access control (MAC) address field of the Ethernet OAM Loopback frame includes a specific unicast MAC address of the subscriber device.

26. The access node of claim 14, wherein, for a one-to-one service, a destination media access control (MAC) address field of the Ethernet OAM Loopback frame includes one of a unicast MAC address of the access node and a multicast address.

27. A non-transitory computer-readable medium comprising instructions that, when executed, cause one or more processors to:
   receive, with an access node, an Ethernet operations, administration, and maintenance (OAM) Loopback frame from an originating device within an Ethernet network;
   construct, with the access node, an Asynchronous Transfer Mode (ATM) OAM End-to-End Loopback cell from the Ethernet OAM Loopback frame; and
   transmit the ATM OAM End-to-End Loopback cell from the access node towards a virtual circuit connected to a subscriber device within an ATM network to verify end-to-end connectivity from the originating device within the Ethernet network to the subscriber device within the ATM network,
   wherein the instructions that cause the one or more processors to construct the ATM OAM End-to-End Loopback cell from the Ethernet OAM Loopback frame further comprise instructions that, when executed, cause the one or more processors to translate data from one or more fields of the Ethernet OAM Loopback frame into a source identification (ID) field of the ATM OAM End-to-End Loopback cell.

28. The non-transitory computer-readable medium of claim 27, wherein the instructions cause the processors to translate data included in one or more fields of the Ethernet OAM Loopback frame into at least one field of the ATM OAM End-to-End Loopback cell.

29. The non-transitory computer-readable medium of claim 28, further comprising instructions that cause the processors to not translate data included in at least one of the fields in the Ethernet OAM Loopback frame into a field of the ATM OAM End-to-End Loopback cell, and store the data at the access node.

30. The non-transitory computer-readable medium of claim 27, wherein the instructions cause the processors to translate data from a source media access control (MAC) field, one or more virtual local area network (VLAN) tag fields, and a maintenance level field of the Ethernet OAM Loopback frame into the source identification (ID) field of the ATM OAM End-to-End Loopback cell.

31. The non-transitory computer-readable medium of claim 27, further comprising instructions that cause the processors to:

receive, with the access node, an ATM OAM Loopback reply cell from the subscriber device;

construct, with the access node, an Ethernet OAM Loopback reply frame from the ATM OAM Loopback reply cell; and transmit the Ethernet OAM Loopback reply frame from the access node towards the originating device within the Ethernet network.

32. The non-transitory computer-readable medium of claim 31, further comprising instructions that cause the processors to translate data from the source identification (ID) field of the ATM OAM Loopback reply cell into a destination media access control (MAC) field, one or more virtual local area network (VLAN) tag fields, and a maintenance level field of the Ethernet OAM Loopback reply frame.

33. The non-transitory computer-readable medium 27, further comprising instructions that cause the processors to:
store, with the access node, mapping information that associates an identifier of the subscriber device with the virtual circuit connected to the subscriber device; and
identify the virtual circuit connected to the subscriber device from the mapping information based on the subscriber device identifier included in the Ethernet OAM Loopback frame.

34. The non-transitory computer-readable of claim 33, wherein for a one-to-one service, the subscriber device identifier comprises a virtual local area network (VLAN) tag associated with the subscriber device.

35. The non-transitory computer-readable medium of claim 33, wherein for a many-to-one service, the subscriber device identifier comprises a media access control (MAC) address of the subscriber device.

36. The non-transitory computer-readable medium of claim 27, wherein for a many-to-one service, a destination media access control (MAC) address field of the Ethernet OAM Loopback frame includes a specific unicast MAC address of the subscriber device.

37. The non-transitory computer-readable medium of claim 27, wherein for a one-to-one service, a destination media access control (MAC) address field of the Ethernet OAM Loopback frame includes one of a unicast MAC address of the access node and a multicast address.

38. The method of claim 1, wherein the one or more fields of the Ethernet OAM Loopback frame comprise a source media access control (MAC) address field.

39. The method of claim 1, wherein the one or more fields of the Ethernet OAM Loopback frame comprise one or more virtual local area network (VLAN) tag fields.

40. The method of claim 1, wherein the one or more fields of the Ethernet OAM Loopback frame comprise a maintenance level field.

* * * * *